US009787616B2

(12) United States Patent
Xu et al.

(10) Patent No.: US 9,787,616 B2
(45) Date of Patent: Oct. 10, 2017

(54) METHOD AND APPARATUS FOR EXCHANGING STATUS UPDATES WHILE COLLABORATING

(75) Inventors: Hai Xu, Beijing (CN); Xiao Song, Beijing (CN)

(73) Assignee: Nokia Technologies Oy, Espoo (FI)

( * ) Notice: Subject to any disclaimer, the term of this patent is extended or adjusted under 35 U.S.C. 154(b) by 163 days.

(21) Appl. No.: 14/419,718

(22) PCT Filed: Aug. 22, 2012

(86) PCT No.: PCT/CN2012/080469
§ 371 (c)(1),
(2), (4) Date: Mar. 5, 2015

(87) PCT Pub. No.: WO2014/029089
PCT Pub. Date: Feb. 27, 2014

(65) Prior Publication Data
US 2015/0215243 A1    Jul. 30, 2015

(51) Int. Cl.
*H04L 12/58* (2006.01)
*G06Q 50/10* (2012.01)
(Continued)

(52) U.S. Cl.
CPC ........... *H04L 51/04* (2013.01); *G06Q 10/101* (2013.01); *G06Q 50/10* (2013.01); *H04L 67/06* (2013.01)

(58) Field of Classification Search
USPC ....... 709/204, 205, 206, 225, 203, 217, 219, 709/223, 224, 226, 228, 231, 232, 238; 705/2
See application file for complete search history.

(56) References Cited

U.S. PATENT DOCUMENTS 7,058,722 B2    6/2006 Ikami et al.
7,631,098 B2   12/2009 Boutboul et al.
(Continued)

FOREIGN PATENT DOCUMENTS

CN   1399447 A   2/2003
CN   1565105 A   1/2005
(Continued)

OTHER PUBLICATIONS

International Search Report and Written Opinion received for corresponding Patent Cooperation Treaty Application No. PCT/CN2012/080469, dated May 23, 2013, 11 pages.
(Continued)

*Primary Examiner* — Quang N Nguyen
(74) *Attorney, Agent, or Firm* — Ditthavong & Steiner, P.C.

(57) ABSTRACT

An approach, is presented for exchanging status updates while on and/or offline when collaborating on various activities via one or more networks. A method comprises determining one or more tasks associated with at least one collaborative activity for one or more devices participating in the at least one collaborative activity. The method also comprises determining status information for the one or more tasks with respect to the one or more devices. Further, the method also comprises causing, at least in part, an exchange of the status information among the one or more devices via at least one communication mechanism that supports offline messaging.

14 Claims, 11 Drawing Sheets

(51) Int. Cl.
*H04L 29/08* (2006.01)
*G06Q 10/10* (2012.01)

(56) References Cited

U.S. PATENT DOCUMENTS

| | | | | |
|---|---|---|---|---|
| 7,711,775 | B2* | 5/2010 | Tavis | G06F 8/65 |
| | | | | 709/225 |
| 7,752,253 | B2* | 7/2010 | Manion | G06Q 10/10 |
| | | | | 709/205 |
| 7,921,217 | B2 | 4/2011 | Yan et al. | |
| 7,941,123 | B2 | 5/2011 | Yang et al. | |
| 8,055,712 | B2* | 11/2011 | Kagawa | G06F 17/30873 |
| | | | | 709/205 |
| 8,856,169 | B2* | 10/2014 | Zhang | G06Q 10/06313 |
| | | | | 705/2 |
| 2008/0104170 | A1 | 5/2008 | Ananthanarayanan | |
| 2008/0165701 | A1 | 7/2008 | Ananthanarayanan et al. | |
| 2010/0030578 | A1* | 2/2010 | Siddique | G06Q 10/0637 |
| | | | | 709/206 |
| 2011/0252093 | A1* | 10/2011 | Spataro | G06Q 10/10 |
| | | | | 709/204 |
| 2011/0302253 | A1* | 12/2011 | Simpson-Anderson | H04L 51/04 |
| | | | | 709/206 |

FOREIGN PATENT DOCUMENTS

| | | |
|---|---|---|
| CN | 102316156 A | 1/2012 |
| WO | 2009/115026 A1 | 9/2009 |

OTHER PUBLICATIONS

Rao et al., "Client Level Framework for Parallel Downloading of Large File Systems", International Journal of Computer Applications, vol. 3, No. 2, Jun. 2010, pp. 32-38.

Extended European Search Report received for corresponding European Patent Application No. 12883341.5, dated Apr. 15, 2016, 6 pages.

Office action received for corresponding Chinese Patent Application No. 201280075992.3, dated Jul. 18, 2016, 21 pages of office action and 4 pages of office action translation available.

Chencai, "The Study of MultiAgents-Based Download Model", Thesis, Information science and technology division, vol. 7, 2005, 56 pages.

Lixia, "The Study of MultiAgents-BasedDownload Model", Journal of Zhejiang Normal University, vol. 28, Issue 2, May 2005, pp. 168-171.

Office Action for corresponding Chinese Patent Application No. 201280075992.3, dated Mar. 15, 2017, English Language Summary Included, 24 pages.

* cited by examiner

METHOD AND APPARATUS FOR EXCHANGING STATUS UPDATES WHILE COLLABORATING

RELATED APPLICATION

This application was originally filed as Patent Cooperation Treaty Application No. PCT/CN2012/080469 filed Aug. 22, 2012.

BACKGROUND

Service providers and device manufacturers (e.g., wireless, cellular, etc.) are continually challenged to deliver value and convenience to consumers by, for example, providing compelling network services. As the network services (e.g., via the Internet) have become diversified and sophisticated, users may utilize various devices (e.g., laptops computers, mobile phones, PDAs, etc.) and applications to perform various activities and tasks using the network services such as e-mail, web browsing, downloading digital content, executing various processes and applications, purchasing of digital media, sports updates, searching for various information, and the like via content and service providers. However, with an increase in available content and content file sizes (e.g., in tens to hundreds of megabytes), it may take longer times and more network and device resources to download a given content item (e.g., a video, a musical album, a digital book, etc.) and/or execute various processes and applications. Further, other factors affecting the network services for a user may be network availability, network access speed, network access cost, device capabilities, and the like, wherein users and/or the devices may utilize network and device resource availability to coordinate a collaboration on various tasks. Accordingly, service providers and device manufacturers face significant technical challenges in providing efficient methods for users and/or devices to exchange status updates among a plurality of devices and network components when collaborating on various activities (e.g., obtaining content, performing various tasks, etc.) via one or more networks.

SOME EXAMPLE EMBODIMENTS

Therefore, there is a need for an approach for exchanging status updates while on and/or offline when collaborating on various activities via one or more networks.

According to one embodiment, a method comprises determining one or more tasks associated with at least one collaborative activity for one or more devices participating in the at least one collaborative activity. The method also comprises determining status information for the one or more tasks with respect to the one or more devices. Further, the method also comprises causing, at least in part, an exchange of the status information among the one or more devices via at least one communication mechanism that supports offline messaging.

According to another embodiment, an apparatus comprises at least one processor, and at least one memory including computer program code for one or more computer programs, the at least one memory and the computer program code configured to, with the at least one processor, cause, at least in part, the apparatus to determine one or more tasks associated with at least one collaborative activity for one or more devices participating in the at least one collaborative activity. The apparatus is further caused to determine status information for the one or more tasks with respect to the one or more devices. Further, the apparatus is also caused to cause, at least in part, an exchange of the status information among the one or more devices via at least one communication mechanism that supports offline messaging.

According to another embodiment, a computer-readable storage medium carrying one or more sequences of one or more instructions which, when executed by one or more processors, cause, at least in part, an apparatus to determine one or more tasks associated with at least one collaborative activity for one or more devices participating in the at least one collaborative activity. The apparatus is further caused to determine status information for the one or more tasks with respect to the one or more devices. Further, the apparatus is also caused to cause, at least in part, an exchange of the status information among the one or more devices via at least one communication mechanism that supports offline messaging.

According to another embodiment, an apparatus comprises means for determining one or more tasks associated with at least one collaborative activity for one or more devices participating in the at least one collaborative activity. The apparatus further comprises means for determining status information for the one or more tasks with respect to the one or more devices. Further, the apparatus also comprises means for causing, at least in part, an exchange of the status information among the one or more devices via at least one communication mechanism that supports offline messaging.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-30 and 51-53.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for exchanging status updates while on and/or offline when collaborating on various activities via one or more networks. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
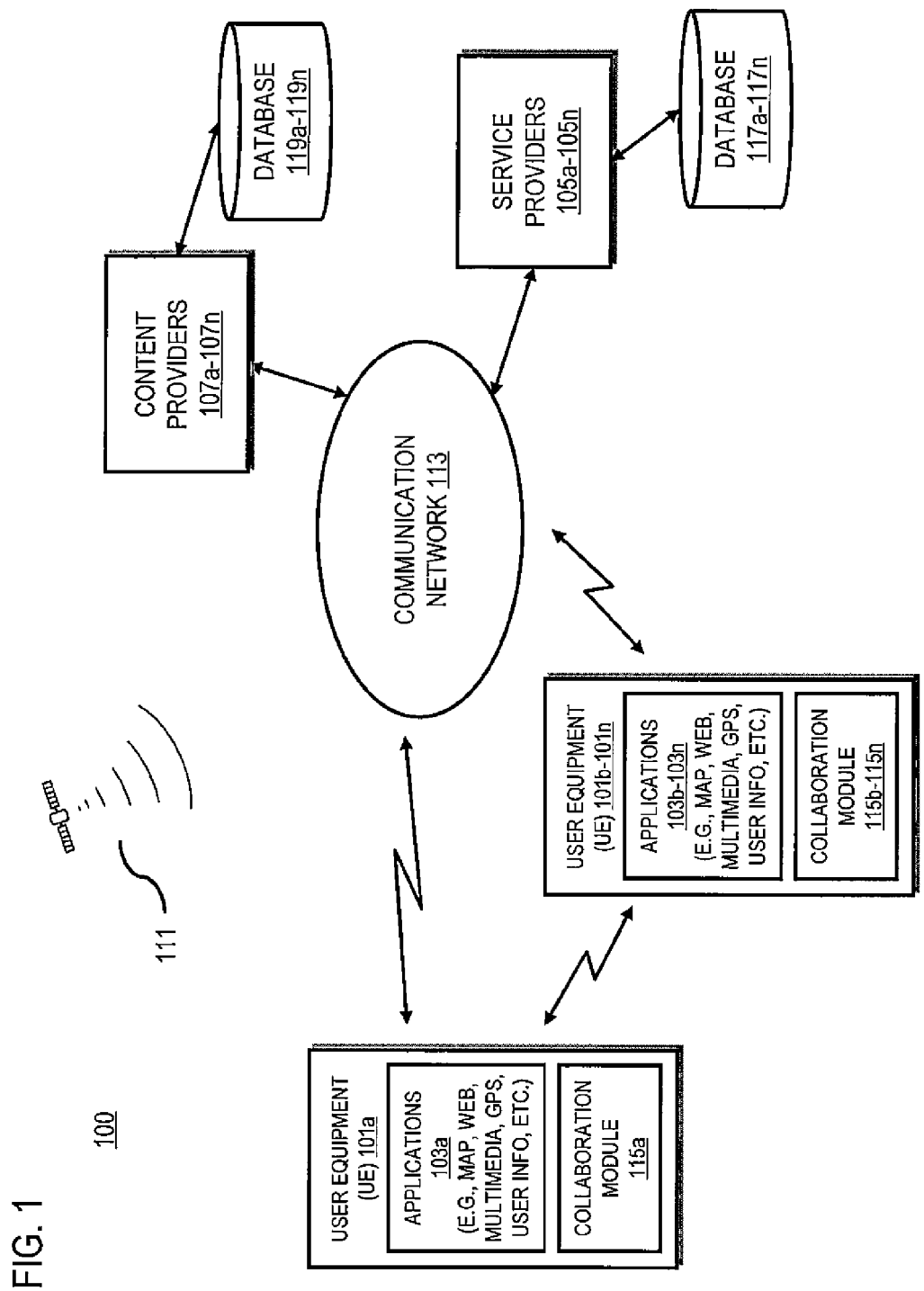
FIG. 1 is a diagram of a system capable of exchanging status updates while on and/or offline when collaborating on various activities via one or more networks, according to an embodiment.

FIG. 1 is a diagram of a system capable of exchanging status updates while on and/or offline when collaborating on various activities via one or more networks, according to an embodiment. As discussed previously, although networks (e.g., cellular, wireless local area network (WLAN), etc.) and services (e.g., Internet, online shopping, content downloading, collaborating on various tasks, etc.) have been developed and have proliferated, access to those networks and services may not be available to everyone all the time and may have certain limitations; for example, network performance (e.g., speed, reliability, etc.), cost to users (e.g., may be expensive at certain times and at certain locations), availability of different networks and services at different times, at different locations, and/or to different users. In other words, some users (e.g., user devices) in some areas of the world (e.g., rural, developing, etc.) may not always have access to various, reliable, cost effective, and/or efficient networks and services. To combat such issues, in some instances, the users may wish to utilize a plurality of their own devices (e.g., a mobile phone, a computer, a tablet, etc.) and/or ask other users (e.g., family members, colleagues, classmates, friends, etc.) to utilize their devices for collaborating on one or more activities (e.g., tasks, content downloading, processing large digital items, executing applications, and the like) where the plurality of the devices may more efficiently perform one or more portions/tasks of the one or more activities (e.g., at a same or different times, at a same or different locations) and then coordinate one or more further processes (e.g., compilations, mergings, etc.) for the one or more portions/tasks (e.g., digital files) of the one or more activities. For example, three devices may be coordinated so that each device may download a portion of a content item (e.g., in three portions) via one or more network connections (e.g., concurrently or at different times) and then coordinate to merge the downloaded portions for recreating the original content item. In another example, a plurality of devices may be coordinated to process (e.g., run/execute an application or a process, etc.) different portions of a digital item (e.g., a digital image file, a complex design file, etc.) However, such collaborative activities would require timely and accurate online/offline status information (e.g., related to a device and/or a network) from each user, each device, and/or each network component so that activities and tasks for the devices may be determined and coordinated accordingly.

To address, at least these problems, a system 100 of FIG. 1 introduces the capability for exchanging status updates while on and/or offline when collaborating on various activities via one or more networks. In various embodiments of the system 100, the status updates may be exchanged via one or more communication channels and/or via one or more components of the system 100 (e.g., communication channels, servers, etc.), for example, when collaborating on one or more activities. In one user case scenario, a first user (e.g., an initiating user/device) may ask one or more other users (e.g., family members, colleagues, classmates, etc.) and/or directly request for their devices to assist with downloading a content item (e.g., for purchase, for free, etc.), wherein the initiating device and the one or more other devices may or may not be co-located, may or may not be of same type of devices, and may be connected to a same or different service networks (network). Further, the initiating device and/or the one or more other devices may start, stop, and/or resume participating in the collaboration and one or more status updates may be exchanged among the initiating user/device, the one or more other users/devices, and/or one or more components of the system 100 to indicate progress, changes, resource information of the one or more devices and the networks, and the like associated with the collaboration.

As shown in FIG. 1, in one embodiment, the system 100 includes user equipment (UE) 101*a* and 101*b*-101*n* (also collectively referred to as UE 101 and/or UEs 101), which may be utilized to execute one or more applications 103a-103n (also collectively referred to as applications 103) including games, social networking, web browser, media application, user interface (UI), map application, web client, etc. to communicate with other UEs 101, one or more service providers 105a-105n (also collectively referred to as service providers 105), one or more content providers 107a-107n (also collectively referred to as content providers 107), one or more GPS satellites 111, and/or with other components of the system 100 directly and/or via communication network 113. In one embodiment, the UE 101a may be an initiating device for one or more collaborations. In various embodiments, one or more components (e.g., a UE 101, a network component, a service provider, a content provider, etc.) of the system 100 may initiate one or more collaborations. In one embodiment, the UEs 101 may include collaboration modules 115a and 115b-115n (also collectively referred to as collaboration module 115) for initiating and/or participating in one or more collaborations with one or more other users. For example, an initiating user may utilize one of the UEs 101a-101n (e.g., UE 101a) and invite one or more other users/devices (e.g., UE 101b-101n) to partake in one or more collaboration activities (e.g., process a digital file, download a content item, etc.) In addition, the UE 101 can execute an application 103 that is a software client for storing, processing, and/or forwarding one or more content items, information items, communication messages, and the like to other components of the system 100.

In one embodiment, the service providers 105 may include and/or have access to one or more database 117a-117n (also collectively referred to as database 117), which may include various user information, content items, user profiles, user preferences, one or more profiles of one or more user devices (e.g., device configuration, sensors information, etc.), service provider information, other service provider information, and the like.

In one embodiment, the content providers 107 may include and/or have access to one or more database 119a-119n (also collectively referred to as database 119), which may store, include, and/or have access to various content items. For example, the content providers 107 may store content items (e.g., at the database 119) provided by various users, various service providers and the like. In various embodiments, the content providers 107 may sort, manage, store, and/or make the content items available based on various parameters, for example, location information (e.g., of a submitter, of a content item, of a requestor, etc.), sequential order, content type, date/time of content creation and/or submission, date/time of a content request, and the like. In various embodiments, the content may include media items, maps, metadata (e.g., location information, content type, content creator, etc.) associated with the content items, various points of interest (POIs), and the like.

In one embodiment, the UE 101 includes a location module/sensor that can determine the UE 101 location (e.g., a user's location). The UE 101 location can be determined by a triangulation system such as a GPS, assisted GPS (A-GPS), Cell of Origin, wireless local area network triangulation, or other location extrapolation technologies. Standard GPS and A-GPS systems can use the one or more satellites 111 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geo-graphically mapped. The location module/sensor may also utilize multiple technologies to detect the location of the UE 101. GPS coordinates can provide finer detail as to the location of the UE 101. In another embodiment, the UE 101 may utilize a local area network (e.g., WLAN) connection to determine the UE 101 location information, for example, from an Internet source (e.g., a service provider).

In one embodiment, the service providers 105 may include one or more service providers offering one or more services, for example, messaging (e.g., instant messaging (IM), online chatting, etc.), online shopping, social networking services (e.g., blogging), media upload, media download, media streaming, account management services, or a combination thereof. Further, the service providers 105 may conduct a search for content, media, information, and the like associated with one or more users and/or one or more products. In certain embodiments, the collaboration module 115 implemented as a collection of one or more hardware, software, algorithms, firmware, or combinations thereof that can be integrated for use with the service providers 105 and/or with the content providers 107. In various embodiments, the collaboration module 115 can be maintained on a network server, while operating in connection with the service providers 105 and/or with the content providers 107 as an extensible feature, a web-service, an applet, a script, an object-oriented application, or the like to enable searching for and/or processing of the social networking information. Further, the collaboration module 115, the service providers 105, and/or the content providers 107 may utilize one or more service application programming interfaces (APIs)/integrated interface, through which communication, media, content, and information (e.g., status information, resource information) may be exchanged, shared, accessed, and/or processed.

In one embodiment, the system 100 determines one or more tasks associated with at least one collaborative activity for one or more devices participating in the at least one collaborative activity. In various embodiments, the at least one collaborative activity includes a downloading of one or more files, an executing of one or more processes, one or more applications, or a combination thereof. In one use case scenario, a user wishes to conduct an activity (e.g., download a digital file, process a digital file, etc.) via a service network (e.g., cellular, WLAN, etc.) Further, the user and/or the system 100 (e.g., a client application) may determine that the activity may be more efficient if it is performed by a plurality of devices (e.g., the user's and one or more family members' devices) as a collaborative activity. For example, a network available to the user, may not be efficient enough (e.g., slow, expensive, unreliable, etc.) for the user to efficiently perform the entire activity alone, or that the network may be available only for a short period of time (e.g., the user will be away from the network availability area), or that the network may have limitations (e.g., office use only), and the like. In one embodiment, the system 100 may determine one or more tasks (e.g., download one or more portions of a media file, process one or more portions of an image file, etc.) for the plurality of the devices to perform. In one example, a media file may be 100 megabytes in size, which may be segmented into four 25-megabyte portions so that four devices may, each, download a portion. In various embodiments, the collaborating devices may be at different locations, may be of different types of devices, may have access to different networks (e.g., cellular, WLAN, direct connection to the Internet, etc.), and the like.

In various embodiments, the system 100 determines status information for the one or more tasks with respect to the one or more devices, wherein the status information is determined by one or more components of a service network based, at least in part, on one or more information items received from one or more components of the service network. For example, the one or more devices, one or more servers, one or more service providers, and the like may provide one or more status information on tasks that each device may be engaged in and/or may be associated with (e.g., a pending task). For example, a device may indicate a progress of downloading a portion of a content item and/or may indicate one or more pending tasks. In one example, a service provider may determine the status information of the one more tasks by analyzing progress information of the one or more tasks and/or one or more status information from the one or more devices. In one example, a content provider may determine progress status of the one or more tasks based on information associated with an activity (e.g., collaborative) including the one or more devices.

In one embodiment, the system 100 causes an exchange of the status information among the one or more devices via at least one communication mechanism that supports offline messaging. In various embodiments, one or more of the one or more devices may be offline with respect to the at least one collaborative activity, the at least one communication mechanism, or a combination thereof. For example, one or more collaborating devices may be offline (e.g., not collaborating, not downloading, not processing, etc.), but may still submit and/or receive status information from and/or to one or more other devices and/or one or more components of the system 100 via at least one communication mechanism, wherein the at least one communication mechanism includes, at least in part, a server-mediated communication mechanism, a peer-to-peer communication mechanism, or a combination thereof. In one embodiment, the peer-to-peer communication mechanism is based, at least in part, on an instant messaging communication (IM) protocol. In various embodiments, one or more components of the server-mediated communication mechanism are configured to distribute the status information to the one or more devices. In various examples, a device may exchange status information with one or more other devices; a device may receive status information from one device and relay it to one or more other devices and/or components of the system 100; one or more devices may submit/retrieve one or more status information via one or more service providers when back online; and the like. In various embodiments, the status information may be presented to a user of a device such that the user may interact with the status information, or the status information may be presented to the user and/or the device as an encoded message such that the user and/or one or more applications on the device may utilize the status information with or without an interaction with the user.

In one embodiment, the system 100 causes a modification of the one or more tasks based, at least in part, on the status information. In one embodiment, one or more of the one or more devices (e.g., collaborating devices) may determine from the status information and/or cause one or more task modifications. In one embodiment, one or more components of the system 100; for example, a service provider, a content provider, a server, and the like may determine and/or cause the modification. For example, one of the collaborating devices may no longer be able/willing to collaborate (e.g., not downloading, not processing) where its remaining one or more tasks may be reassigned, paused, cancelled, and the like. In one example, a new device is available for collaboration, wherein a task may be assigned to it. In one example, a device may have completed an assigned task and is willing/able to accept another task.

In one embodiment where a collaborative activity includes a downloading of one or more files, the system 100 causes a partitioning of the one or more files into one or more portions. For example, a user may identify a file for downloading (e.g., a content item file from a content provider) via one or more of the user's devices, wherein one or more other users' devices may be requested to collaborate in the downloading. In one embodiment, the system 100; for example, one or more applications on one or more devices (e.g., client application), one or more components of a service network, and the like may determine partitioning of the file for the download into one or more portions. For example, a file with a size of one-gigabyte (1 GB) may be partitioned into five 200-megabyte portions so that the one or more devices may download the portions. In various embodiments, a file selected for downloading may include metadata indicating recommended partitioning possibilities, or one or more algorithms may be utilized to determine the partitioning, or a default method may be utilized to partition the file (e.g., divide the file size by the number of collaborating devices), and the like.

In one embodiment, the system 100 causes, at least in part, an assignment of a downloading the one or more portions as the one or more tasks for the one or more devices. In various embodiments, the one or more devices, one or more service providers, one or more content providers, one or more components of the system 100, and the like may assign the one or more portions as one or more tasks for the one or more collaborating devices.

In one embodiment, the system 100 determines resource information associated with the one or more devices, one or more networks associated with the one or more devices, or a combination thereof. In various embodiments, one or more devices and/or one or more components of one or more networks may determine resource information associated with the one or more devices and/or the one or more networks. For example, the resource information may include device power status information (e.g., battery information), device processor load information (e.g., how many tasks, usage percentage, etc.), priority information for one or more pending tasks (e.g., priority listing of pending tasks), and the like. Further, the resource information associated with the one or more networks may include, at least in part, network speed information, network reliability information, network type, network access cost information, other limitations (e.g., private, public, etc.), or a combination thereof. In various embodiments, a network element (e.g., a proxy server, a service provider, etc.) may report connectivity status of the one or more devices (e.g., online, offline, etc.) to the one or more devices, to one or more components of the one or more networks, and the like. In one embodiment, the status information includes, at least in part, the resource information. For example, a device or a network element may include one or more associated resource information items in a status information associated with a respective device and/or a network element.

In one embodiment, the system 100 determines the partitioning of the one or more files, the assignment of the one or more portions, or a combination thereof based, at least in part, on the resource information. In various embodiments, one or more collaborating devices may have different device and/or network resources available to them; therefore, the system 100 may partition the one or more files selected for downloading into one or more portions based on the resource information and then assign the one or more portions to the one or more devices based on the resource information. For example, a device having better resources (e.g., more battery life, faster processor, etc.) and one or more better network connections (e.g., faster, more reliable, less expensive, etc.) may be assigned more portions/tasks. In one example, a device accepting to participate in the collaboration may be re-evaluated (e.g., before and/or during the collaboration) based on resources available to that device at a given time.

In one embodiment, the system 100 determines a completion of the downloading of the one or more portions. In various embodiments, the system 100 determines from one or more devices, one or more components of one or more networks, one or more service providers, one or more content providers, and the like information on progress and/or completion of the downloading of the one or more portions assigned to the one or more devices. For example, the progress and/or completion information may be determined from the status information, the resource information, or a combination thereof. In one example, the completion information may be determined from one device, which has completion information from the remaining one or more devices participating in the collaboration.

In one embodiment, the system 100 causes, at least in part, a sharing of the one or more portions among the one or more devices. In various embodiments, the one or more devices may share one or more downloaded portions with one or more other collaborating devices and/or with one or more other devices (e.g., a computer, a storage location, etc.). For example, one or more devices may share/submit their respective downloaded portions (e.g., via Bluetooth®, near filed communication (NFC), IrDA, wired connection, etc.)

In one embodiment, the system 100 causes, at least in part, a processing of the one or more portions by the one or more devices based, at least in part, on the one or more resource information. In various embodiments, one or more collaborating devices and/or one or more other devices (e.g., a computer, a server, a tablet, a smart phone, etc.) may access the one or more portions (e.g., downloaded, processed, analyzed, etc.) and further process them. For example, three devices may share/submit several completed portions of a download to another device (e.g., a computer, a mobile phone, etc.) so that the other device may further process the completed portions; for example, integrate, compile, merge, and the like. It is noted that the processing may be performed by any device, collaborating or not, on any number of portions of completed downloaded, processed segments, and the like. For example, if there are five portions to a download and there are three portions already downloaded, then one or more devices may process (e.g., merge) the three portions for merging with the remaining two portions when available.

In one embodiment, the collaboration module 115, the service providers 105, and/or the content providers 107 may interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.) Further, the UEs 101 may include various sensors for collecting data associated with a user, a user's environment, and/or with a UE 101, for example, the sensors may determine and/or capture audio, video, images, atmospheric conditions, device location, user mood, ambient lighting, user physiological information, device movement speed and direction, and the like.

By way of example, the UEs 101, the service providers 105, and the content providers 107 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
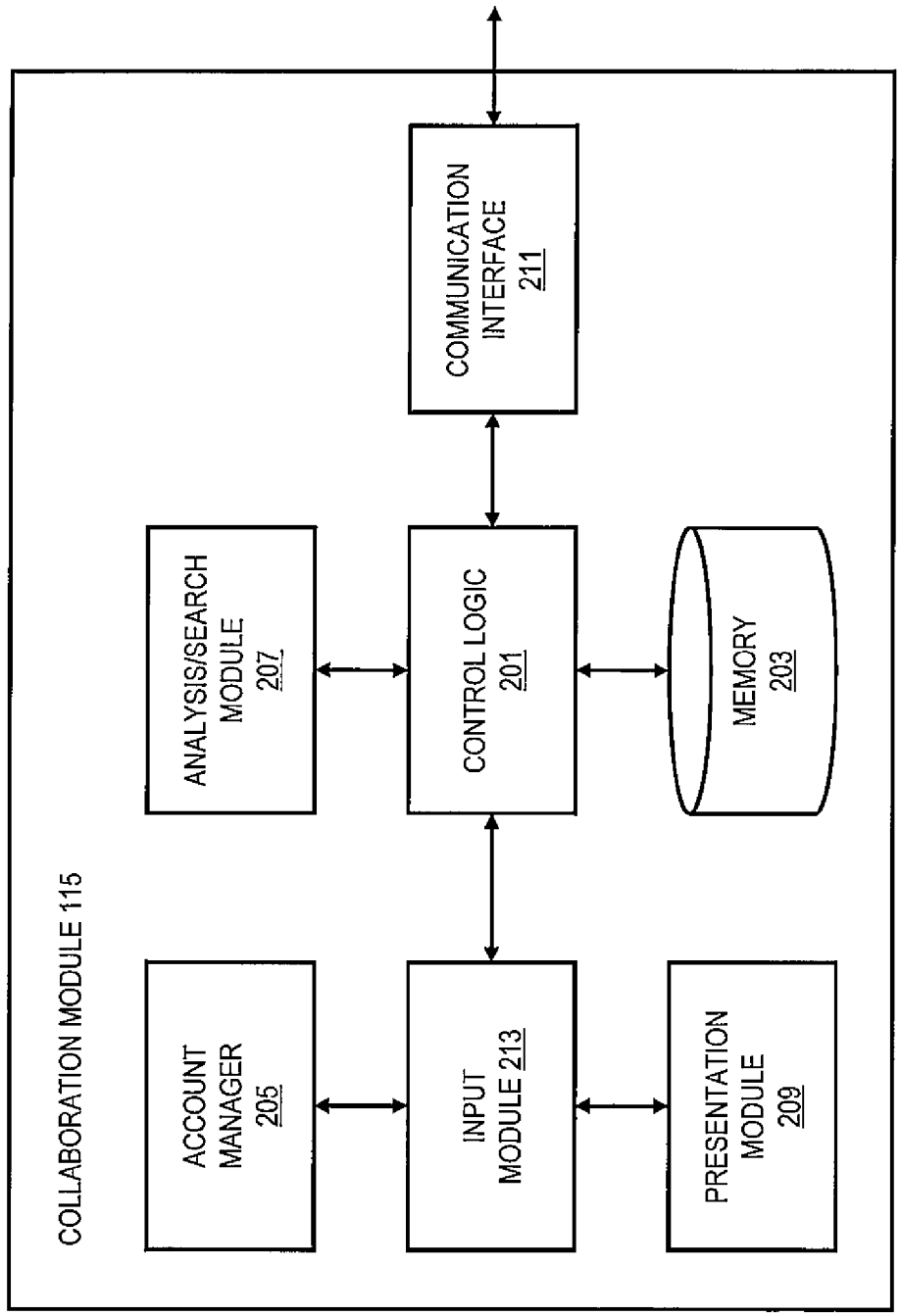
FIG. 2 is a diagram of the components of a collaboration module, according to an embodiment.

FIG. 2 is a diagram of the components of a collaboration module, according to an embodiment. By way of example, the collaboration module 115 includes one or more components for performing one or more tasks associated with one or more collaboration activities. It is contemplated that the functions of these components may be combined in one or more components or performed by other components of equivalent functionality. In this embodiment, the collaboration module 115 includes control logic (or processor) 201, memory 203, an account manager 205, an analysis/search module 207, a presentation module 209, a communication interface 211, and an input module 213.

The control logic 201 executes at least one algorithm, software, application, and the like for executing functions of the collaboration module 115. For example, the control logic 201 may interact with the account manager 205 to receive a request to register a user, one or more content items, one or more processes, one or more collaboration activities, and the like. In determining whether to complete the registration request, the account manager 205 may process information associated with the user, such as the user's account information, user status, user ranking, privacy policy, security policy, etc. If, for instance, it is determined that the user satisfies one or more requirements of a service provider, a content provider, one or more other users, and the like the account manager 205 may then register and associate the user with the at least one media item and other related information. As such, the account manager 205 may work with the analysis/search module 207, via the control logic 201, to process the user and the one or more activities information to generate a user profile and/or add new device information to an account already associated with the user. In one embodiment, the analysis/search module 207 may analyze one or more activities selected by a user of a UE 101, determine one or more possible collaborative activities (e.g., a task suitable for collaboration), and search for one or more other users/devices (e.g., friends, family members, colleagues, classmates, etc.) that may be nearby (e.g., via Bluetooth®) and/or available (e.g., remotely) for participating in the one or more possible collaborative activities.

The presentation module 209 may present all or a portion of one or more status and/or resource information items associated with the one or more collaborative activities, the one or more participating devices, the one or more users, the one or more networks, and the like. Further, the collaboration module 115 may share all or a portion of the one or more status and/or resource information with one or more service providers (e.g., social networking), content providers, and the like based, at least in part, on one or more privacy and/or security policies.

The control logic 201 may also utilize the communication interface 211 to communicate with other components of the system 100, for example, the UEs 101, the service providers 105, the content providers 107, one or more servers, and the like. For example, the communication interface 211 may transmit a notification to a user's device to indicate whether the user's collaboration request has been registered/accepted with one or more other users, one or more content providers, one or more service providers, and the like. The communication interface 211 may also manage and control receiving various requests from other UEs 101, the service providers 105, the content providers 107, and/or other entities of the system 100. The communication interface 211 may further include multiple means of communication. In one use case, the communication interface 211 may be able to communicate over SMS, internet protocol, instant messaging, voice sessions (e.g., via a phone network), or other types of communication.

The input module 213 manages various types of input received via a UE 101. For example, the input module 213 manages receiving an input for selecting elements of a collaboration activity, status and/or resource information, one or more networks, one or more content items, one or more processes, and the like. The presentation module 209 controls display of a user interface (UI) such as a graphical user interface (GUI), to convey information and to allow user to interact with a UE 101 via the interface. The presentation module 209 interacts with the controller 201, the communication interface 211 and the analysis/search module 207 to display any information generated during their operation (e.g., displaying the status information, collaboration activity, and the like.

Figure 3:
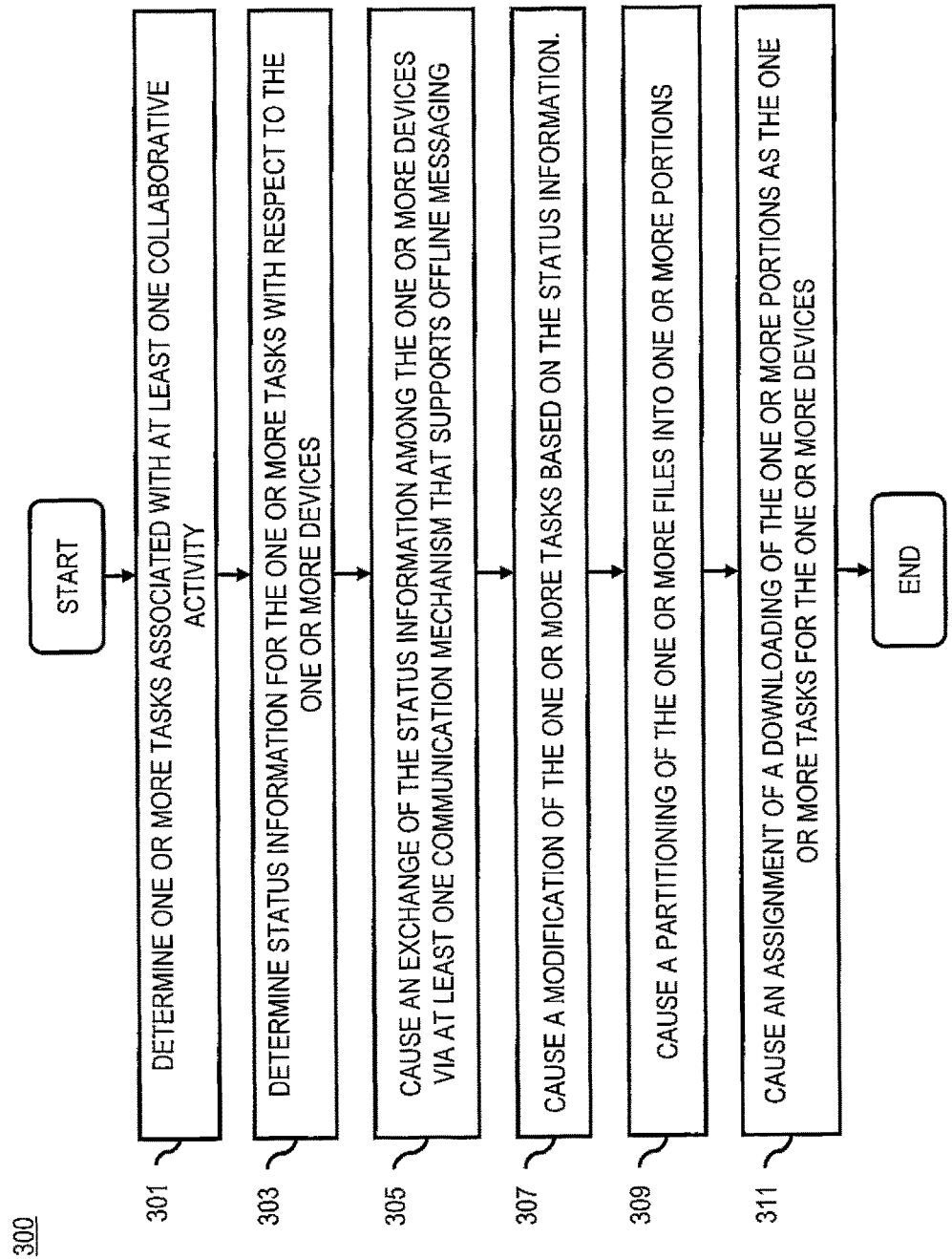
FIGS. 3 and 4 are flowcharts of processes for exchanging status updates while on and/or offline when collaborating, according to various embodiments.
Figure 10:
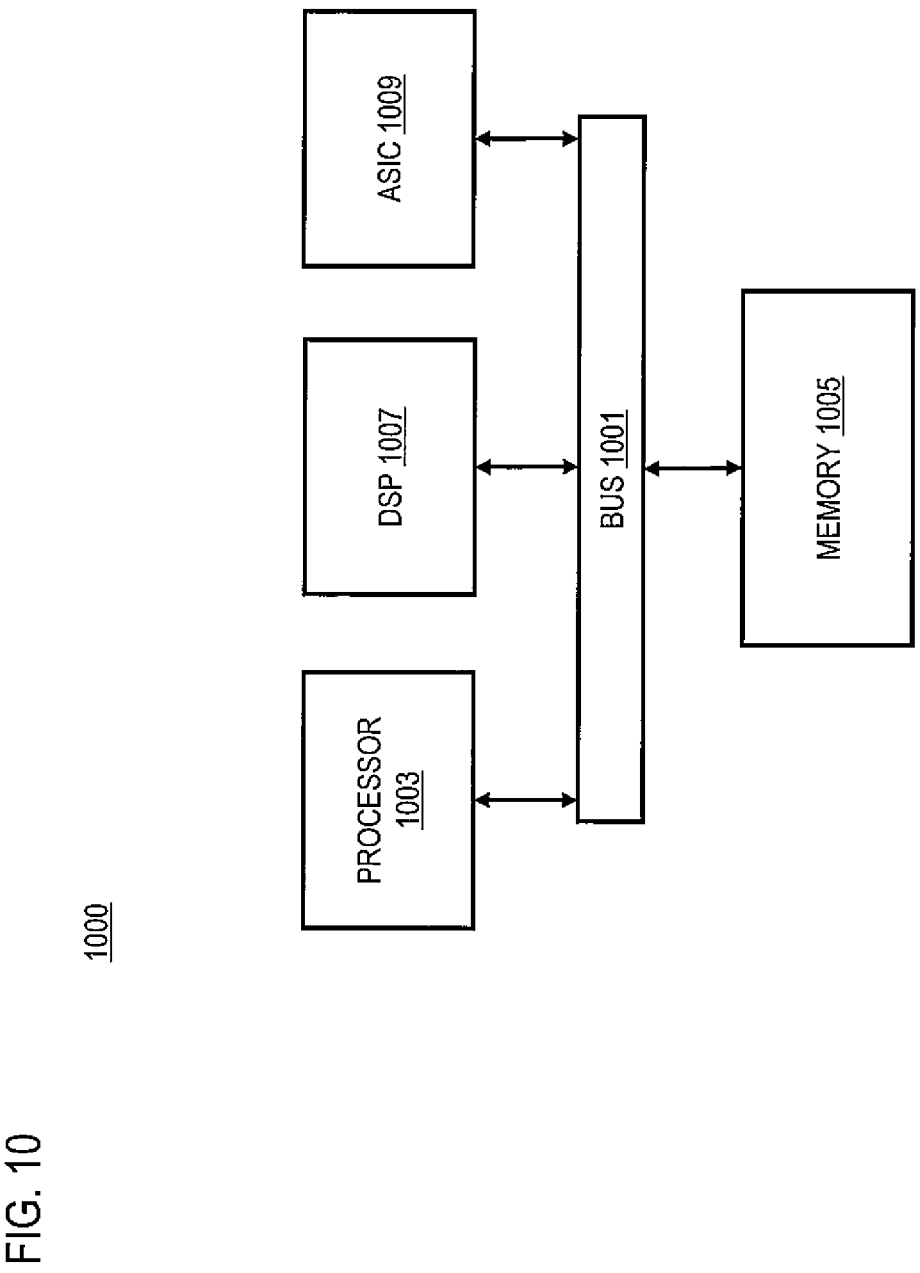
FIG. 10 is a diagram of a chip set that can be used to implement an embodiment of the invention.

FIG. 3 is a flowchart of a process for, at least, exchanging status information associated with one or more collaboration activities, according to an embodiment. In one embodiment, the collaboration module 115, the service providers 105 and/or the applications 103 perform all or a portion of the process 300 and are implemented in, for instance, a chip set including a processor and a memory as shown in FIG. 10. As such, the collaboration module 115, the service providers 105 and/or the applications 103 can provide means for accomplishing various parts of the process 300 as well as means for accomplishing other processes in conjunction with other components of the system 100. Throughout this process, the collaboration module 115 is referred to as completing various portions of the process 300, however, it is understood that other components of the system 100 can perform some of and/or all of the process steps. Further, in various embodiments, the collaboration module 115 may be implemented in one or more entities of the system 100.

In step 301, the collaboration module 115 determines one or more tasks associated with at least one collaborative activity for one or more devices participating in the at least one collaborative activity. In various embodiments, the at least one collaborative activity includes a downloading of one or more files, an executing of one or more processes, one or more applications, or a combination thereof. In one use case scenario, a user wishes to conduct an activity (e.g., download a digital file, process a digital file, etc.) via a service network (e.g., cellular, WLAN, etc.) Further, the user and/or the system 100 (e.g., a client application) may determine that the activity may be more efficient if it is performed by a plurality of devices (e.g., the user's and one or more family members' devices) as a collaborative activity. For example, a network available to the user, may not be efficient enough (e.g., slow, expensive, unreliable, etc.) for the user to efficiently perform the entire activity alone, or that the network may be available only for a short period of time (e.g., the user will be away from the network availability area), or that the network may have limitations (e.g., office use only), and the like. In one embodiment, the system 100 may determine one or more tasks (e.g., download one or more portions of a media file, process one or more portions of an image file, etc.) for the plurality of the devices to perform. In one example, a media file may be 100 megabytes in size, which may be segmented into four 25-megabyte portions so that four devices may, each, download a portion. In various embodiments, the collaborating devices may be at different locations, may be of different types of devices, may have access to different networks (e.g., cellular, WLAN, direct connection to the Internet, etc.), and the like.

In step 303, the collaboration module 115 determines status information for the one or more tasks with respect to the one or more devices, wherein the status information is determined by one or more components of a service network based, at least in part, on one or more information items received from one or more components of the service network. For example, the one or more devices, one or more servers, one or more service providers, and the like may provide one or more status information on tasks that each device may be engaged in and/or may be associated with (e.g., a pending task). For example, a device may indicate a progress of downloading a portion of a content item and/or may indicate one or more pending tasks. In one example, a service provider may determine the status information of the one more tasks by analyzing progress information of the one or more tasks and/or one or more status information from the one or more devices. In one example, a content provider may determine progress status of the one or more tasks based on information associated with an activity (e.g., collaborative) including the one or more devices.

In step 305, the collaboration module 115 causes an exchange of the status information among the one or more devices via at least one communication mechanism that supports offline messaging. In various embodiments, one or more of the one or more devices may be offline with respect to the at least one collaborative activity, the at least one communication mechanism, or a combination thereof. For example, one or more collaborating devices may be offline (e.g., not collaborating, not downloading, not processing, etc.), but may still submit and/or receive status information from and/or to one or more other devices and/or one or more components of the system 100 via at least one communication mechanism, wherein the at least one communication mechanism includes, at least in part, a server-mediated communication mechanism, a peer-to-peer communication mechanism, or a combination thereof. In one embodiment, the peer-to-peer communication mechanism is based, at least in part, on an instant messaging communication (IM) protocol. In various embodiments, one or more components of the server-mediated communication mechanism are configured to distribute the status information to the one or more devices. In various examples, a device may exchange status information with one or more other devices; a device may receive status information from one device and relay it to one or more other devices and/or components of the system 100; one or more devices may submit/retrieve one or more status information via one or more service providers when back online; and the like. In various embodiments, the status information may be presented to a user of a device such that the user may interact with the status information, or the status information may be presented to the user and/or the device as an encoded message such that the user and/or one or more applications on the device may utilize the status information with or without an interaction with the user.

In step 307, the collaboration module 115 causes a modification of the one or more tasks based, at least in part, on the status information. In one embodiment, one or more of the one or more devices (e.g., collaborating devices) may determine from the status information and/or cause one or more task modifications. In one embodiment, one or more components of the system 100; for example, a service provider, a content provider, a server, and the like may determine and/or cause the modification. For example, one of the collaborating devices may no longer be able/willing to collaborate (e.g., not downloading, not processing) where its remaining one or more tasks may be reassigned, paused, cancelled, and the like. In one example, a new device is available for collaboration, wherein a task may be assigned to it. In one example, a device may have completed an assigned task and is willing/able to accept another task.

In step 309, the collaboration module 115 causes, at least in part, a partitioning of the one or more files into one or more portions. In one embodiment, where a collaborative activity includes a downloading of one or more files, the system 100 causes a partitioning of the one or more files into one or more portions. For example, a user may identify a file for downloading (e.g., a content item file from a content provider) via one or more of the user's devices, wherein one or more other users' devices may be requested to collaborate in the downloading. In one embodiment, the system 100; for example, one or more applications on one or more devices (e.g., client application), one or more components of a service network, and the like may determine partitioning of the file for the download into one or more portions. For example, a file with a size of one-gigabyte (1 GB) may be partitioned into five 200-megabyte portions so that the one or more devices may download the portions. In various embodiments, a file selected for downloading may include metadata indicating recommended partitioning possibilities, or one or more algorithms may be utilized to determine the partitioning, or a default method may be utilized to partition the file (e.g., divide the file size by the number of collaborating devices), and the like.

In step 311, the collaboration module 115 causes, at least in part, an assignment of a downloading the one or more portions as the one or more tasks for the one or more devices. In various embodiments, the one or more devices, one or more service providers, one or more content providers, one or more components of the system 100, and the like may assign the one or more portions as one or more tasks for the one or more collaborating devices.

Figure 4:
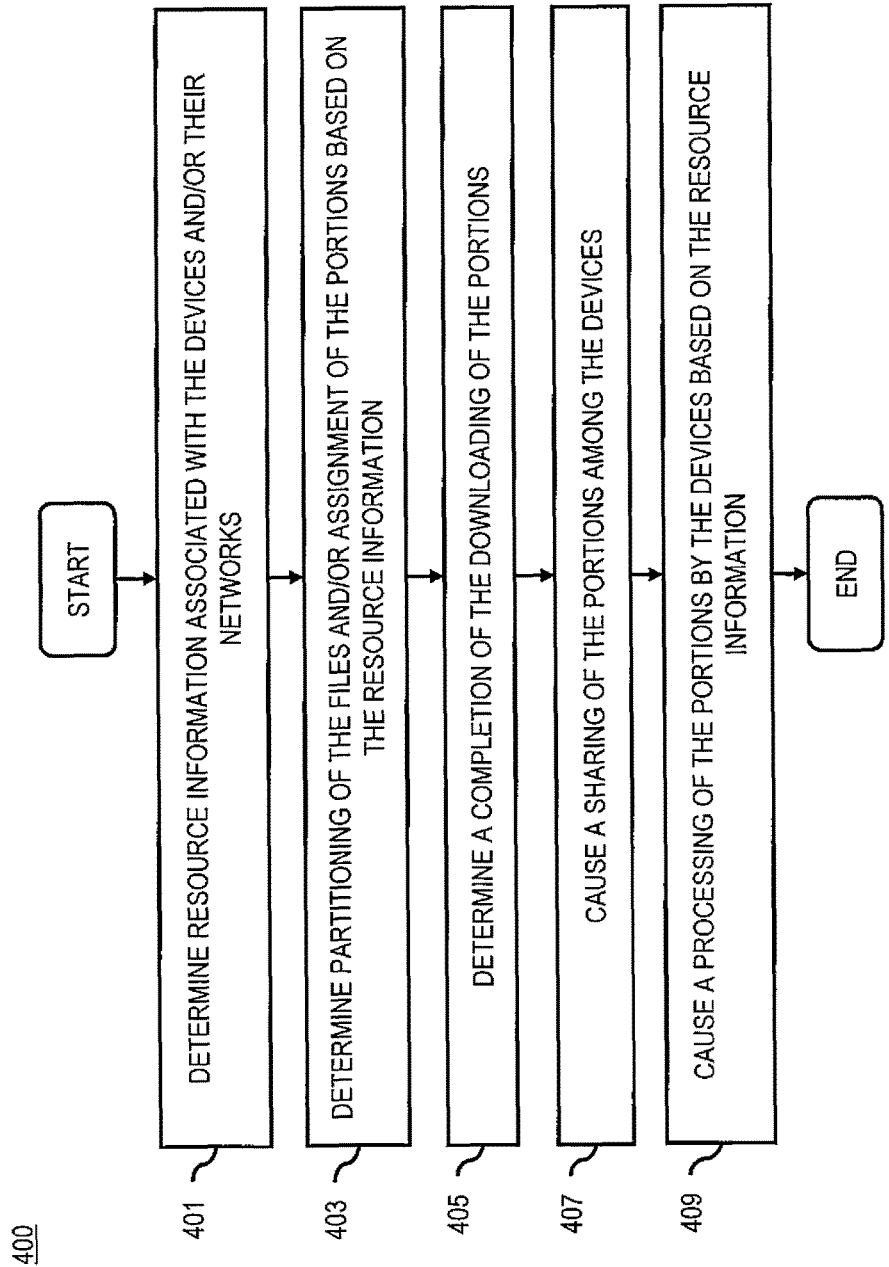

FIG. 4 is a flowchart of a process for, at least, determining a partitioning of a content item based at, at least in part, on resource information, according to an embodiment. In one embodiment, the collaboration module 115, the service providers 105 and/or the applications 103 perform all or a portion of the process 400 and are implemented in, for instance, a chip set including a processor and a memory as shown in FIG. 10. As such, the collaboration module 115, the service providers 105 and/or the applications 103 can provide means for accomplishing various parts of the process 400 as well as means for accomplishing other processes in conjunction with other components of the system 100. Throughout this process, the collaboration module 115 is referred to as completing various portions of the process 400, however, it is understood that other components of the system 100 can perform some of and/or all of the process steps. Further, in various embodiments, the collaboration module 115 may be implemented in one or more entities of the system 100.

In step 401, the collaboration module 115 determines resource information associated with the one or more devices, one or more networks associated with the one or more devices, or a combination thereof. In various embodiments, one or more devices and/or one or more components of one or more networks may determine resource information associated with the one or more devices and/or the one or more networks. For example, the resource information may include device power status information (e.g., battery information), device processor load information (e.g., how many tasks, usage percentage, etc.), priority information for one or more pending tasks (e.g., priority listing of pending tasks), and the like. Further, the resource information associated with the one or more networks may include, at least in part, network speed information, network reliability information, network type, network access cost information, other limitations (e.g., private, public, etc.), or a combination thereof. In various embodiments, a network element (e.g., a proxy server, a service provider, etc.) may report connectivity status of the one or more devices (e.g., online, offline, etc.) to the one or more devices, to one or more components of the one or more networks, and the like. In one embodiment, the status information includes, at least in part, the resource information. For example, a device or a network element may include one or more associated resource information items in a status information associated with a respective device and/or a network element.

In step 403, the collaboration module 115 determines the partitioning of the one or more files, the assignment of the one or more portions, or a combination thereof based, at least in part, on the resource information. In various embodiments, one or more collaborating devices may have different device and/or network resources available to them; therefore, the system 100 may partition the one or more files selected for downloading into one or more portions based on the resource information and then assign the one or more portions to the one or more devices based on the resource information. For example, a device having better resources (e.g., more battery life, faster processor, etc.) and one or more better network connections (e.g., faster, more reliable, less expensive, etc.) may be assigned more portions/tasks. In one example, a device accepting to participate in the collaboration may be re-evaluated (e.g., before and/or during the collaboration) based on resources available to that device at a given time.

In step 405, the collaboration module 115 determines a completion of the downloading of the one or more portions. In various embodiments, the system 100 determines from one or more devices, one or more components of one or more networks, one or more service providers, one or more content providers, and the like information on progress and/or completion of the downloading of the one or more portions assigned to the one or more devices. For example, the progress and/or completion information may be determined from the status information, the resource information, or a combination thereof. In one example, the completion information may be determined from one device, which has completion information from the remaining one or more devices participating in the collaboration.

In step 407, the collaboration module 115 causes, at least in part, a sharing of the one or more portions among the one or more devices. In various embodiments, the one or more devices may share one or more downloaded portions with one or more other collaborating devices and/or with one or more other devices (e.g., a computer, a storage location, etc.). For example, one or more devices may share/submit their respective downloaded portions (e.g., via Bluetooth®, near filed communication (NFC), IrDA, wired connection, etc.)

In step 409, the collaboration module 115 causes, at least in part, a processing of the one or more portions by the one or more devices based, at least in part, on the one or more resource information. In various embodiments, one or more collaborating devices and/or one or more other devices (e.g., a computer, a server, a tablet, a smart phone, etc.) may access the one or more portions (e.g., downloaded, processed, analyzed, etc.) and further process them. For example, three devices may share/submit several completed portions of a download to another device (e.g., a computer, a mobile phone, etc.) so that the other device may further process the completed portions; for example, integrate, compile, merge, and the like. It is noted that the processing may be performed by any device, collaborating or not, on any number of portions of completed downloaded, processed segments, and the like. For example, if there are five portions to a download and there are three portions already downloaded, then one or more devices may process (e.g., merge) the three portions for merging with the remaining two portions when available.

Figure 5:
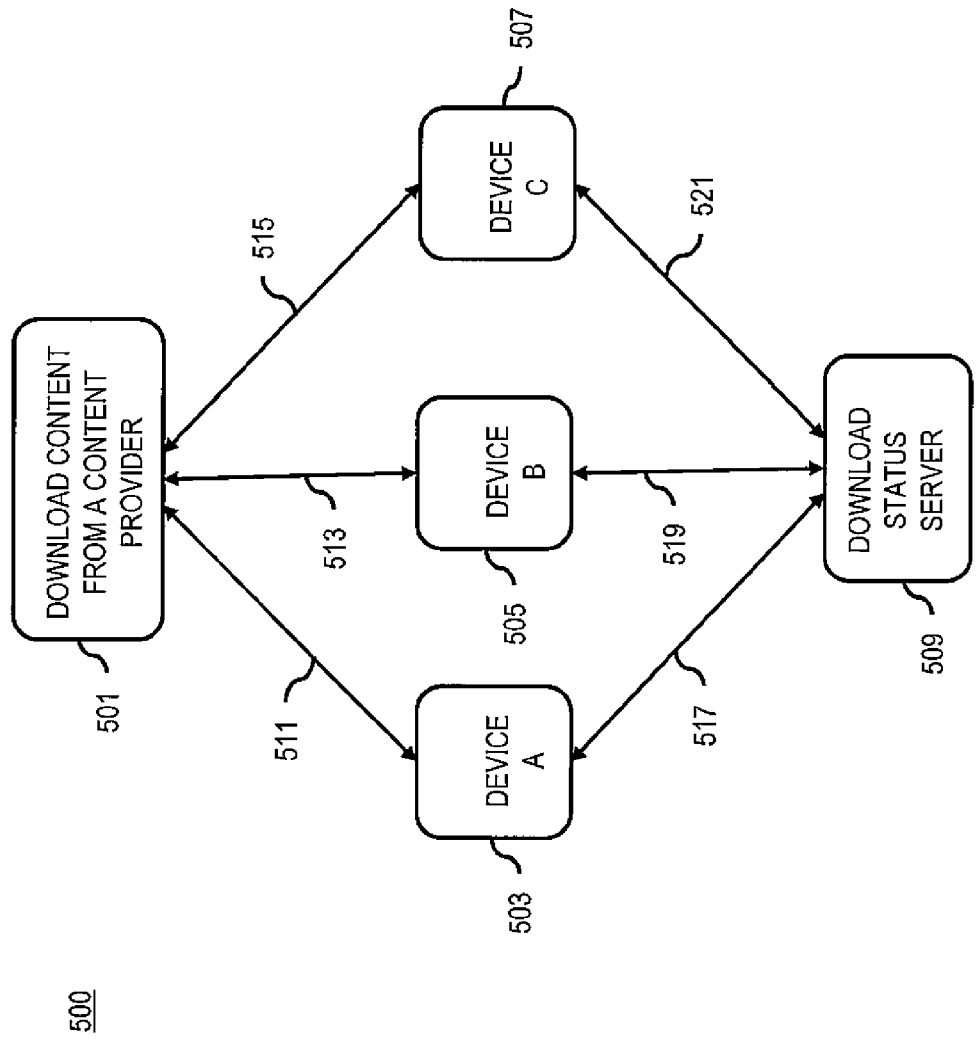
FIGS. 5 and 6 are diagrams of example device and network configurations, according to various embodiments.
Figure 6:
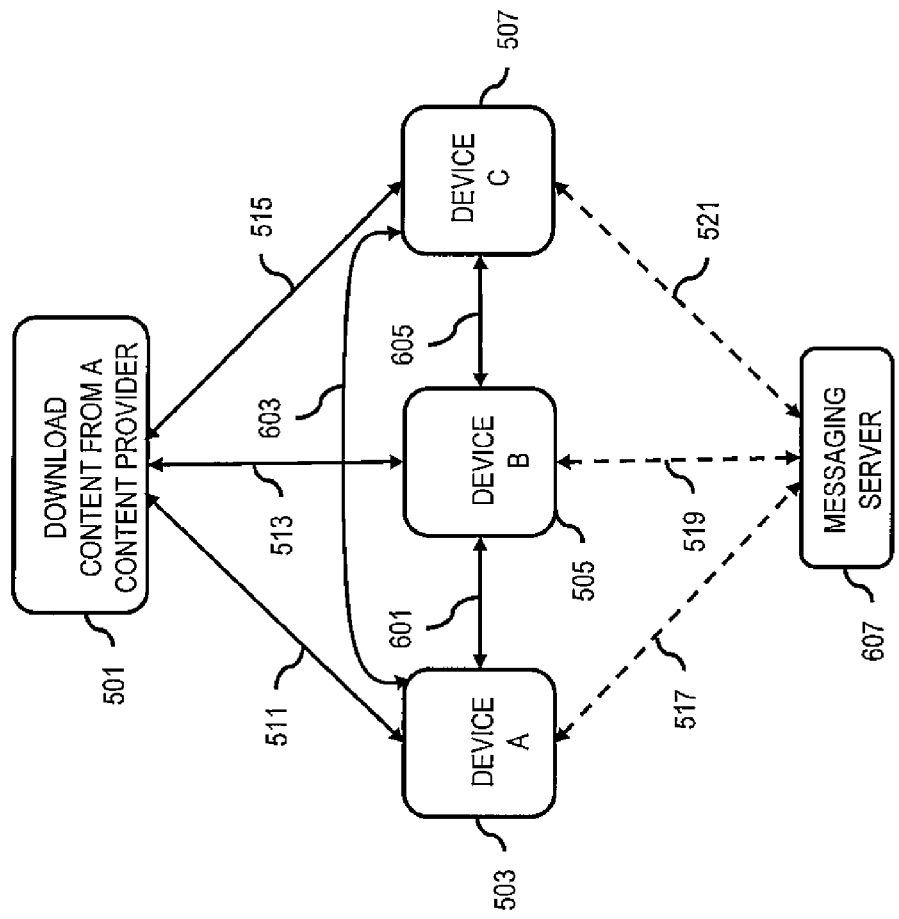

FIGS. 5 and 6 are diagrams of example devices and network configurations, according to various embodiments.

FIG. 5 depicts diagram 500 of a system configuration wherein a collaboration activity 501 is to download content (e.g., media file) from a content provider. In various embodiments, the content may be available from a content provider, a service provider, a user device, and the like. Further, in one example, the system configuration 500 includes plurality of devices, device "A" 503, device "B" 505, and device "C" 507, wherein device "A" is an initiating device and device "B" and "C" are collaborating devices; however, any of a plurality of user devices may be an initiating device or a collaborating device. In one embodiment, the device "A" determines one or more activities, which user "A" wishes to request other users and/or device to participate in. In one example, one or more content items are to be downloaded from a content provider and/or a service provider. Furthermore, the one or more activities may be partitioned into a plurality of tasks (e.g., segments), wherein a device may perform one or more of the plurality of tasks. In the FIG. 5 example, the content item in the activity 501 (e.g., downloading) is partitioned into three tasks 511, 513, and 515, wherein the devices "A," "B," and "C" are to respectively perform the tasks (e.g. download). In one embodiment, each of the devices "A," "B," and "C" exchange status information via communication channels 517, 519, and 521 to a network component, for example, download status server 509, which is accessible by collaborating users. In various embodiments, the status information may be provided by a user of a device and/or may substantially automatically be provided by a collaboration module 115, applications 103, a content provider, a service provider, one or more components of the system 100, or a combination thereof. Further, the status information may be presented via a UI for interaction with a user of a device and/or may be presented (e.g., encoded) for processing by the collaboration module 115 and/or the applications 103, for example, so that one or more information items may be presented to the user of the device, one or more actions may be initiated by the user, the device, a component of the system 100, and the like.

FIG. 6 depicts diagram 600 of a system configuration wherein a collaboration activity 501 is to download one or more content items and wherein one or more communication mechanism are available for exchanging status information. In one embodiment, the devices "A," "B," and "C" are downloading portions 511, 513, and 515 of a content item, wherein the each device may communicate and exchange status information directly with one or more other devices via one or more peer-to-peer communication mechanisms 601, 603, and/or 605. In one embodiment, one or more of the devices may be offline and may retrieve one or more status information from a messaging server 607 (e.g., at a service provider for IM) utilizing available protocols (e.g., XMPP protocol). In one embodiment, a first device may receive status information from a second device, wherein the first device may share the status information of the second device with one or more other devices, one or more service providers, one or more components of a network, and the like.

Figure 7:
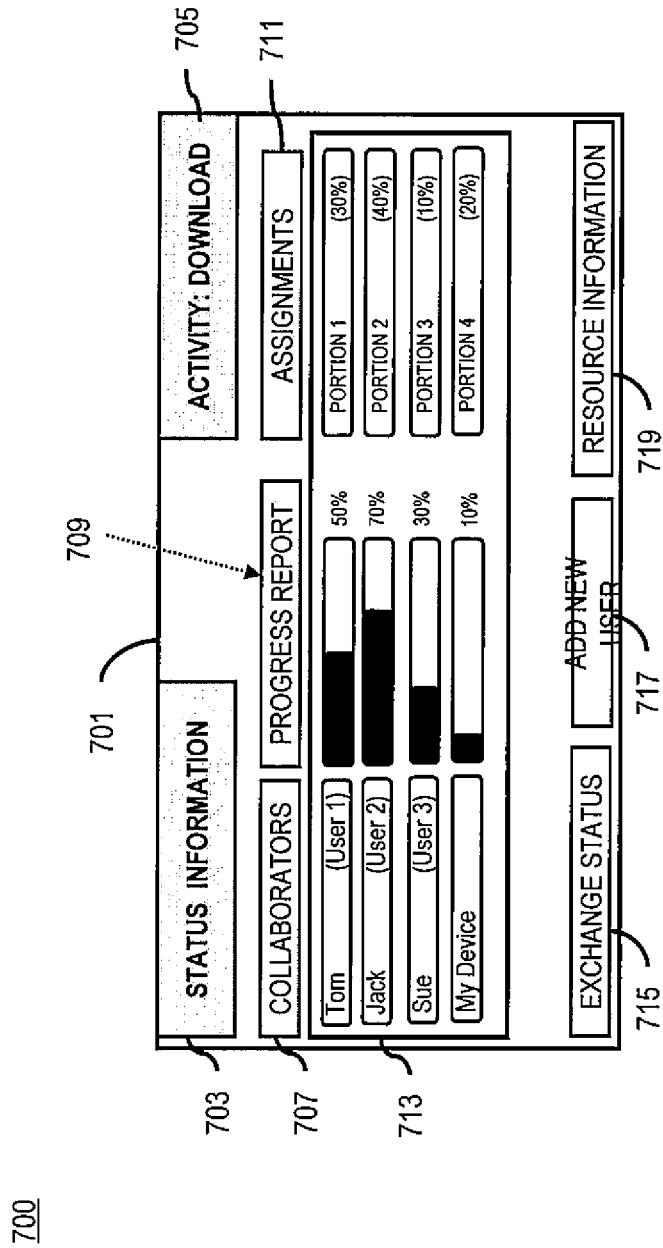
FIGS. 7 and 8 are diagrams of user interfaces at the UE 101 utilized in the processes of FIGS. 3 and 4 by a user, according to various embodiments.
Figure 8:
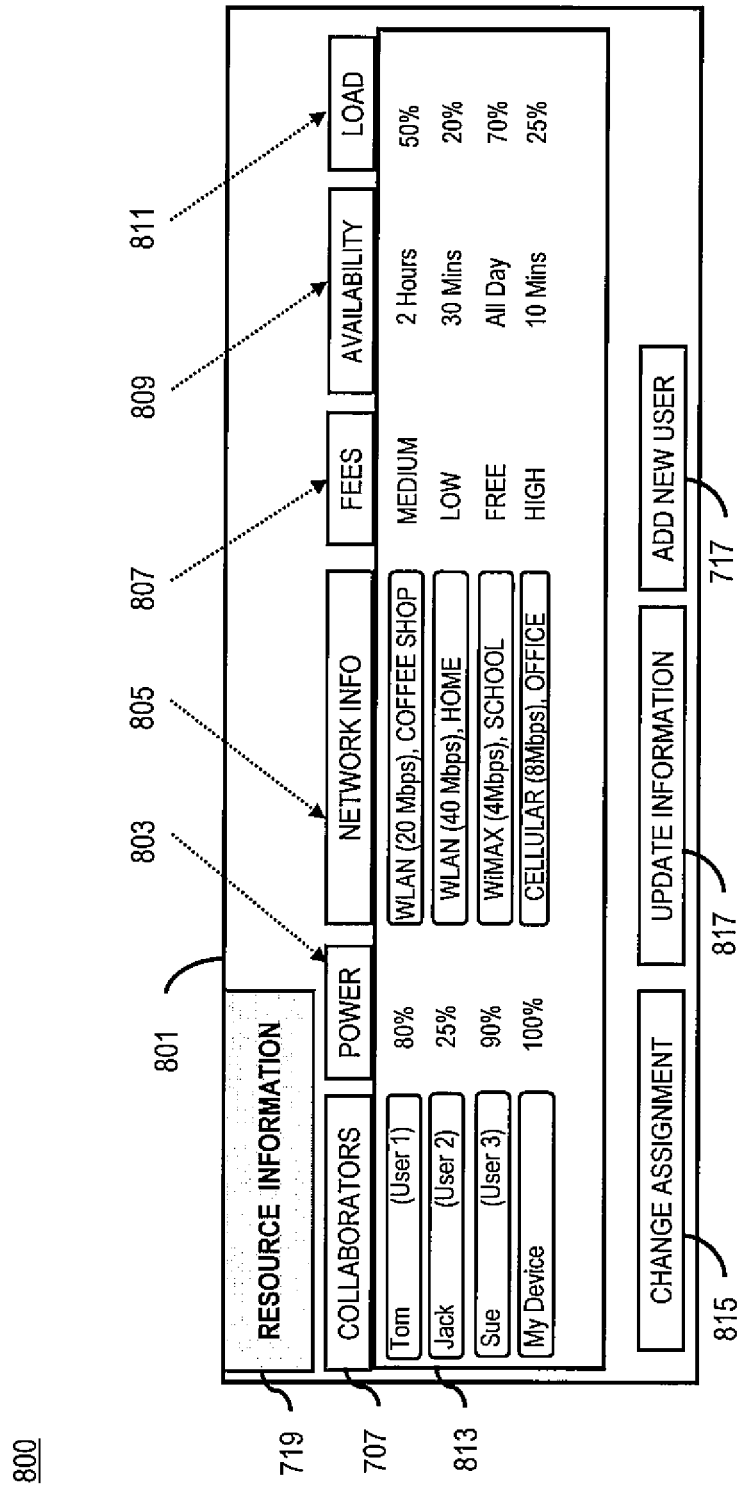

FIGS. 7 and 8 are diagrams of user interfaces utilized in the processes of FIGS. 3 and 4 by a user, according to various embodiments.

FIG. 7 depicts UI 700 including collaboration information 701. In one embodiment, the collaboration information 701 provides status information 703, which may include activity information 705 (e.g., indicating download), collaborators 707, progress report 709, task assignments 711, and detailed information 713. In one example, the detailed information 713 may indicate information on collaborating devices and/or users (e.g, Tom, user 1, user 2, etc.), progress report for each device (e.g., how much of each task completed), and assignment of portions/tasks to each user/device (e.g., portion 1, portion 2, etc.). In one example, each portion may be indicative of a percentage of the total collaboration activity (e.g., portion 1=30%). Further, a user of a user device may interact with the status information via the UI and available options, for example, to "exchange status" 715, "add new user" 717, view "resource information" 719, and the like. In one example, a user may wish to manually initiate exchange status 715, or request/invite a new user/device 717 to partake in the collaboration activity, or request and/or review resource information 719 available to a user and/or a device. In one embodiment, the resource information 719 is included in the status information. In one embodiment, the users and/or the user devices may choose to exchange status information directly with other users/devices as well as with a service provider, a messaging center, a network component, and the like.

FIG. 8 depicts UI 800 including collaboration information 801. In one embodiment, the resource information 719 includes collaborators 707, power 803, network information 805, fees 807, availability 809, load 811, and detailed information 813. In one example, the detailed information 813 may indicate for each collaborating device power level 803 (e.g., battery life); network information 805, for instance, type of network connection, connection speed, location, and the like, any fees 807 associated with network usage (e.g., high, low, etc.), user/device availability 809 (e.g., how long will the device and/or the network connection be available for), load 811 indicative of processing load a device (e.g., 50%, 20%, etc.) may have. In various embodiments, a user, a device, and/or a network component may change assignment 815 of one or more users/devices based, at least in part, on the status information and/or the resource information. Further, a user may wish to request for updated information via option 817 (e.g., resource availabilities may change rapidly).

The processes described herein for exchanging status updates while on and/or offline when collaborating on various activities via one or more networks may be advantageously implemented via software, hardware, firmware, or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
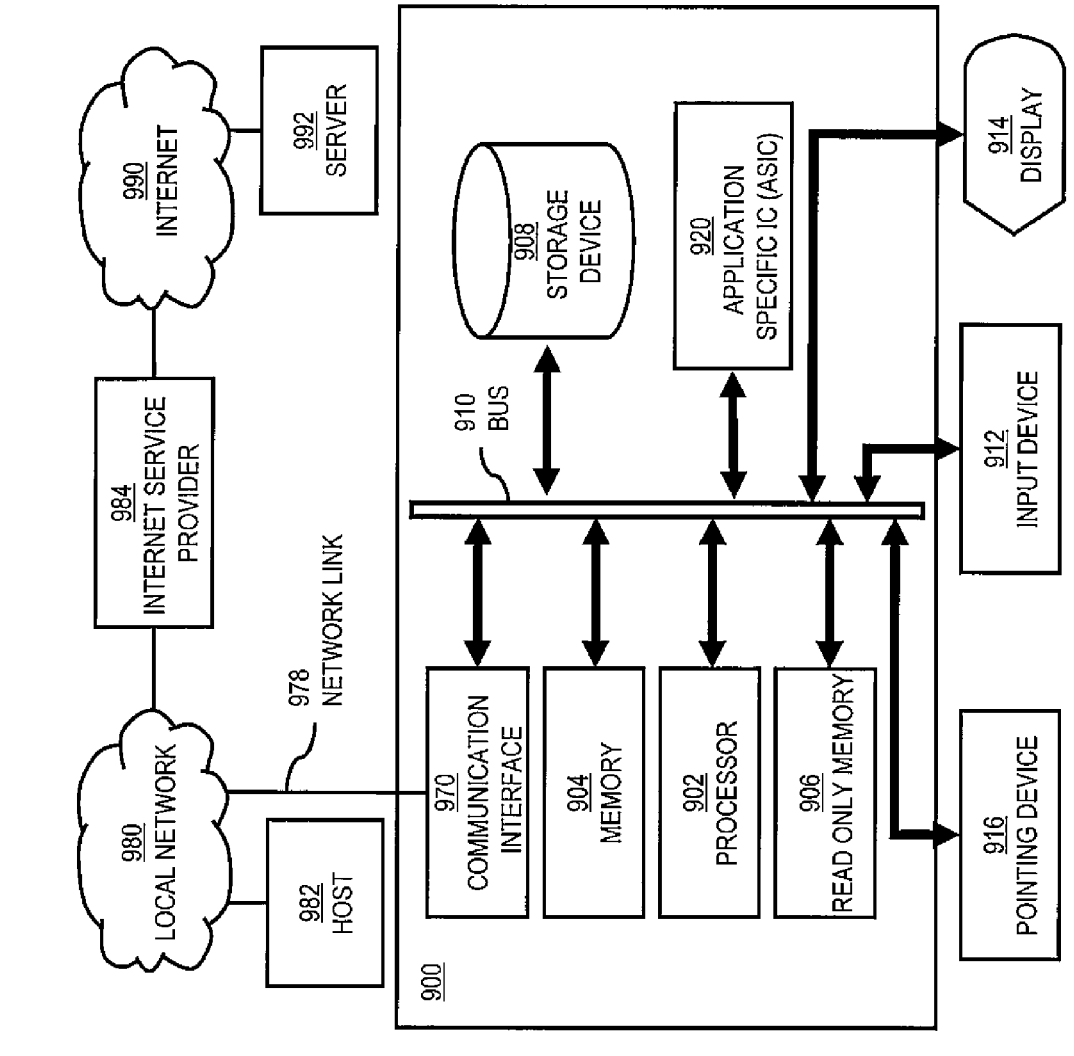
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to share, discover, and/or recommend content items associated with user information and/or other content items as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of exchanging status updates while on and/or offline when collaborating on various activities via one or more networks.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to exchanging status updates while on and/or offline when collaborating on various activities via one or more networks. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for exchanging status updates while on and/or offline when collaborating on various activities via one or more networks. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for exchanging status updates while on and/or offline when collaborating on various activities via one or more networks, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 113 for exchanging status updates while on and/or offline when collaborating on various activities via one or more networks.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed for exchanging status updates while on and/or offline when collaborating on various activities via one or more networks as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of exchanging status updates while on and/or offline when collaborating on various activities via one or more networks.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to share, discover, and/or recommend content items associated with user information and/or other content items. The memory 1005 also stores the data associated with or generated by the execution of the inventive steps.

Figure 11:
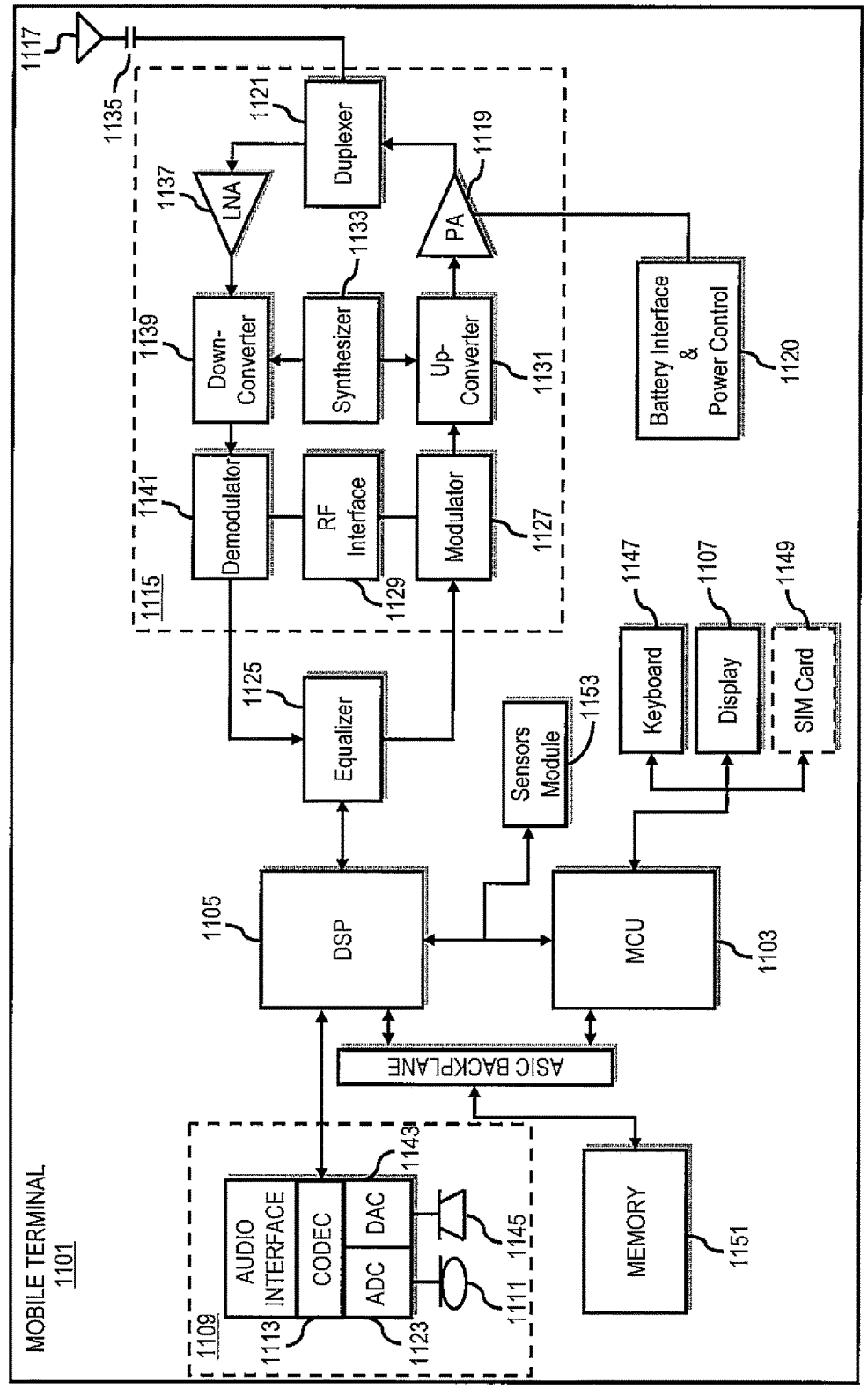
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of exchanging status updates while on and/or offline when collaborating on various activities via one or more networks. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of exchanging status updates while on and/or offline when collaborating on various activities via one or more networks. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 for exchanging status updates while on and/or offline when collaborating on various activities via one or more networks. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Additionally, sensors module 1153 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1101 (e.g., a mobile phone), a user of the mobile terminal 1101, an environment of the mobile terminal 1101 and/or the user, or a combination thereof, wherein the data may be collected, processed, stored, and/or shared with one or more components and/or modules of the mobile terminal 1101 and/or with one or more entities external to the mobile terminal 1101.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   facilitating a processing of (1) data and/or (2) information and/or (3) at least one signal, said facilitating comprises at least the following:
   determining one or more tasks associated with at least one collaborative activity for a plurality of devices participating in the at least one collaborative activity, wherein the one or more tasks are one or more portions of the collaborative activity respectively assigned to each of the plurality of devices to perform as part of the collaborative activity on behalf of an initiating device;
   determining status information for the one or more tasks with respect to said each of the plurality of devices, wherein the status information indicates a progress of said each of the plurality of devices towards respectively completing the one or more tasks;
   causing an exchange of the status information among the plurality of devices via at least one communication mechanism that supports offline messaging, wherein the at least one communication mechanism includes, at least in part, a server-mediated communication mechanism, a peer-to-peer communication mechanism, or a combination thereof; and
   causing a modification of the one or more tasks based, at least in part, on the exchanged status information;
   wherein the at least one collaborative activity is a downloading or a processing of one or more files, an executing of one or more applications, an executing of one or more computer processes, or a combination thereof.

2. The method of claim 1, wherein the peer-to-peer communication mechanism is based, at least in part, on an instant messaging communication protocol.

3. The method of claim 1, wherein one or more components of the server-mediated communication mechanism are configured to distribute the status information to the plurality of devices.

4. The method of claim 1, wherein the status information is determined by one or more components of a service network based, at least in part, on one or more information items received from one or more components of the service network.

5. The method of claim 1, wherein the (1) data and/or (2) information and/or (3) at least one signal are further based, at least in part, on the following:
   a partitioning of the one or more files into one or more portions, wherein the partitioning divides the one or more files so that the one or more portions have smaller respective file sizes than the one or more files; and
   an assignment of the downloading or the processing of the one or more portions as the one or more tasks for said each of the plurality of devices.

6. The method of claim 5, wherein the (1) data and/or (2) information and/or (3) at least one signal are further based, at least in part, on the following:
   at least one determination of resource information associated with said each of the plurality of devices, one or more networks associated with said each of the plurality of devices, or a combination thereof;
   at least one determination of the partitioning of the one or more files, the assignment of the one or more portions, or a combination thereof based, at least in part, on the resource information.

7. The method of claim 6, wherein the resource information includes, at least in part, device power status information, device processor load information, priority information for one or more pending tasks, or a combination thereof.

8. The method of claim 6, wherein the resource information associated with the one or more networks includes, at least in part, network speed information, network reliability information, network access cost information, or a combination thereof.

9. The method of claim 6, wherein the status information includes, at least in part, the resource information.

10. The method of claim 5, wherein the (1) data and/or (2) information and/or (3) at least one signal are further based, at least in part, on the following:
   at least one determination of a completion of the downloading of the one or more portions;
   a sharing of the one or more portions among the plurality of devices; and
   a processing of the one or more portions by said each of the plurality of devices to merge the one or more portions into a complete set of the one or more files based, at least in part, on the one or more resource information.

11. The method of claim 1, wherein one or more of the plurality of devices are offline with respect to the at least one collaborative activity, the at least one communication mechanism, or a combination thereof.

12. An apparatus comprising:
   at least one processor; and
   at least one memory including computer program code for one or more programs, the at least one memory and the computer program code configured to, with the at least one processor, cause the apparatus to perform at least the following:
   determine one or more tasks associated with at least one collaborative activity for a plurality of devices participating in the at least one collaborative activity, wherein the one or more tasks are one or more portions of the collaborative activity respectively assigned to each of the plurality of devices to perform as part of the collaborative activity;
   determine status information for the one or more tasks with respect to said each of the plurality of devices, wherein the status information indicates a progress of said each of the plurality of devices towards respectively completing the one or more tasks;
   cause, at least in part, an exchange of the status information among the plurality of devices via at least one communication mechanism that supports offline messaging, wherein the at least one communication mechanism includes, at least in part, a server-mediated communication mechanism, a peer-to-peer communication mechanism, or a combination thereof; and
   cause, at least in part, a modification of the one or more tasks based, at least in part, on the exchanged status information;
   wherein the at least one collaborative activity is a downloading or a processing of one or more files.

13. The apparatus of claim 12, wherein the peer-to-peer communication mechanism is based, at least in part, on an instant messaging communication protocol.

14. The apparatus of claim 12, wherein one or more components of the server-mediated communication mechanism are configured to distribute the status information to the one or more devices.

* * * * *